United States Patent [19]

Schröder

[11] 3,966,871
[45] June 29, 1976

[54] METHOD AND APPARATUS FOR INSPECTING TUBULAR CAVITIES

[75] Inventor: Peter Schröder, Erlangen, Germany

[73] Assignee: Kraftwerk Union Aktiengesellschaft, Mulheim, Germany

[22] Filed: Nov. 19, 1974

[21] Appl. No.: 525,229

[30] Foreign Application Priority Data
Nov. 26, 1973  Germany............................ 2358802

[52] U.S. Cl................................... 264/318; 264/40; 264/314; 264/334
[51] Int. Cl.² ............................................ B29C 7/00
[58] Field of Search ........... 264/222, 230, 314, 318, 264/334, 40, 315; 138/90,97

[56] References Cited
UNITED STATES PATENTS

| | | | |
|---|---|---|---|
| 907,724 | 12/1908 | Boyle | 138/97 X |
| 2,618,014 | 11/1952 | Sawyer | 264/318 X |
| 2,886,852 | 5/1959 | Rose | 264/318 |
| 3,315,017 | 4/1967 | Kemp | 138/97 X |
| 3,356,777 | 12/1967 | Barnett | 138/97 X |
| 3,423,500 | 1/1969 | Gregory | 264/230 X |
| 3,440,314 | 4/1969 | Frisch | 264/222 |
| 3,803,276 | 4/1974 | Megias | 264/339 X |
| 3,834,422 | 9/1974 | Larson | 138/97 |
| 3,902,528 | 9/1975 | Tartabini | 138/90 |
| 3,903,730 | 9/1975 | Matthews | 138/90 X |

*Primary Examiner*—Robert F. White
*Assistant Examiner*—Thomas P. Pavelko
*Attorney, Agent, or Firm*—Kenyon & Kenyon Reilly Carr & Chapin

[57] ABSTRACT

To inspect an internal zone of a tubular cavity having an open end, for example, a zone of possible damage in a heat-exchanger tube, an elastically hardenable casting plastic is transported to the zone and cast against the surface embraced by the internal zone, and after hardening to an elastic casting, is pulled from the zone for inspection outside of the open end of the cavity. Being elastic, the casting is not permanently deformed when pulled from the zone, the casting providing an undistorted physical image of the surface within the zone, permitting a determination of possible damage including pitting, cracks and the like.

4 Claims, 5 Drawing Figures

METHOD AND APPARATUS FOR INSPECTING TUBULAR CAVITIES

BACKGROUND OF THE INVENTION

To some degree, wall damage in the interior of cavities can be examined optically by means of mirror systems or glass-fiber optical systems, by working through the open end of the cavity. However, this does not provide adequately determined information in many cases; the depth of depressions cannot be accurately determined by optical inspection. Wall damage on the interior of a cavity can, of course, be inspected in detail, by cutting the part forming the cavity, to expose the wall surface. Such destructive testing is normally undesirable and is somewhat impossible.

Non-destructive inspection is, generally speaking, impossible in the case of a heat-exchanger tube. For example, it is necessary to provide for non-destructive inspection of possible damage in a suspected zone of a heat-exchanger tube in the case of a pressurized-water reactor steam generator. At the same time, an accurate determination of the possibility or extent of internal wall damage is important because should the damage warrant, the tube must be plugged and put safely out of service, but the tube should not be put out of service unless the damage makes this a necessity, because the efficiency of the steam generator is lowered by the loss of the tube.

In the above case, it is very desirable to be able to not only make a positive determination of the existence of damage, but also to be able to see its character and to measure the extent and depth of depressions, cracks and the like.

SUMMARY OF THE INVENTION

According to the present invention, a flowable elastically hardenable casting plastic is transported through the end of the cavity, such as a heat-exchanger tube, to the suspected zone and cast against the internal wall surface embraced by this zone to form a hardened but elastically deformable casting. Then this casting is pulled from the zone and out through the open end of the cavity with the casting retaining an accurate physical image of the surface to be inspected. Because the casting is elastically deformable, it can be pulled from the surface on which it was cast, without destruction of detail, the elasticity permitting the casting to be pulled from depressions, cracks and the like, the relief image obtained being returned as soon as the casting is free from restraint. The resulting casting provides a reversed image but this is on an accurate 1:1 scale, permitting positive and accurate measurements of the depths and extents of any damaged areas within the tube.

A low-consistency silicone elastomer is preferably used. In its uncured state, such an elastomer is flowable and can be transported to the suspected zone within the cavity by being pressurized and forced through a tube inserted through the open end of the cavity and to the zone to be inspected. Such an elastomer can be combined with reinforcing fillers or filaments so that after curing for hardening, the elastic casting can be pulled from the cavity, without rupturing. They may be compounded to cure at room temperatures and deep sections can be cured without requiring moisture or heat. The cure rate of such an elastomer depends on the catylist that is employed. A silicone elastomer of the low-consistency type tends to bond strongly to metals, but the prior art knowledge of handling such elastomers includes the use of parting materials which when coated on the metal, prevents the bonding, one such parting material being glycerin.

The prior art knowledge of such elastomers also permits their compounding to adjust shrinkage during the curing or polymerizing. The described elastomer casting is dimensionally stable and tear-resistant to a substantial degree, even when not reinforced, in addition to having the elastically deformable properties permitting the casting to be pulled from the cavity such as the heat-exchanger tube. When pulled, as by pulling on the tube used to transport the elastomer to the zone and which may be left there during the curing, the casting first elastically elongates so as to free itself from depressions, cracks, etc., by its consequent radial contraction, the casting elastically returning to its originally cast shape, due to its resiliency, when this tension is released at the time the casting is freed from the cavity.

To practice the foregoing, the invention provides an apparatus in the form of two dams which can be inserted in the cavity or tube and pneumatically blown and moved to the zone to be inspected, the trailing one of the dams carrying the elastomer transport tube along with it. For tightness, the dams may be elastically deformable radially, as by being inflatable bodies provided with inflating tubes which they carry along with them when blown into position pneumatically. With the two tubes provided with a flexible interconnection, the elastomer may then be forced through its transport tube which opens between the two dams, the plastic being injected under pressure between the dams and forcing them apart to the limits of their restraint permitted by their interconnection, the elastomer thus being cast against the surface requiring inspection.

After curing, one or another or all of the tubes can be used to pull the elastically deformable dams and the casting from the cavity.

BRIEF DESCRIPTION OF THE DRAWINGS

The presently preferred modes for carrying out the invention are schematically illustrated by the accompanying drawings, in which.

DETAILED DESCRIPTION OF THE INVENTION

Figure 1:
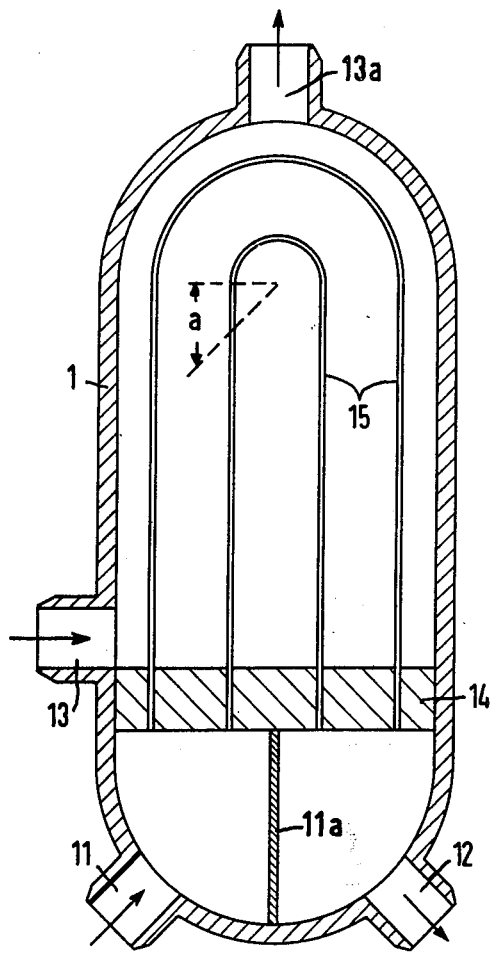
FIG. 1 is a vertical section of a pressurized-water reactor steam generator.

As shown in FIG. 1, a conventional pressurized-water reactor steam generator comprises the pressure vessel or housing 1 having its lower portion or primary header provided with an inlet nozzle 11 and outlet nozzle 12 by which the generator is connected so it forms part of the reactor's coolant loop. A feed-water nozzle 13 feeds into the pressure vessel or housing above the horizontal tube sheet 14 for heating by the U-tube bundle 15, the steam exhausting through the steam output nozzle 13a in the steam dome or top of the vessel or housing 1. Beneath the tube plate 14, a partition 11a separates the incoming coolant from the outgoing coolant, the coolant flowing through the insides of the tubes of the tube bundle 15.

It is to be assumed that as a first step a rough examination of the interior of the tubes of the tube bundle, is made during a reactor shut-down. This may be done by the use of optical equipment, magnetic test methods and the like. If the rough examination provides phenomena which is not clearly recognizable, a detailed investigation of the interior wall condition of the tube zone arousing suspicion, can be made by the practice of the present invention. Such a zone is, for example, indicated at a in FIG. 1.

Figure 2:
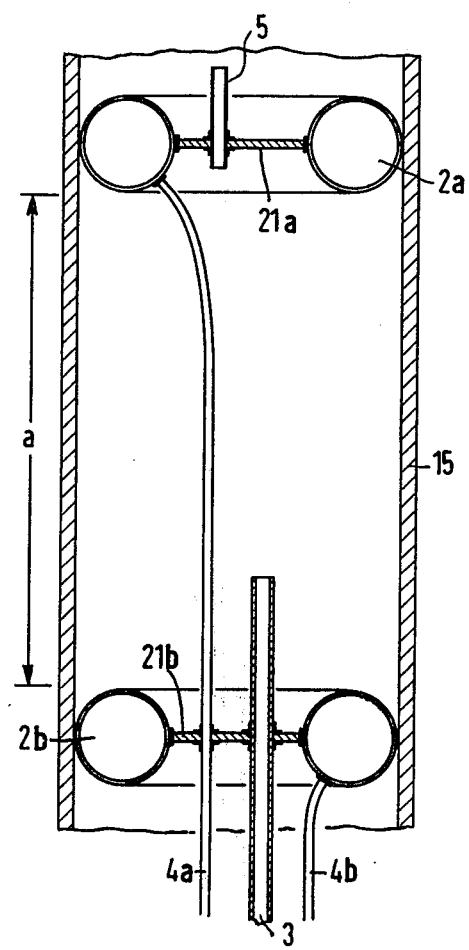
FIG. 2 is a vertical section of one form of the apparatus in position in one of the heat-exchanger tubes of the FIG. 1 generator, and ready to receive the elastomer.

In FIG. 2 the apparatus of the present invention is shown. The two inflatable dams 2, made of an elastic material adequately impervious to the elastomer used, have first been blown into the central portion of the zone a, the dam 2a being the leading tube and the dam 2b being the trailing tube. The dams are respectively provided with inflating tubes 4a and 4b, each is shaped like a donut and each has its inner periphery provided with a closing disk 21a and 21b, respectively. Both inflating tubes are flexible and the tube 4a functions to flexibly interconnect the two dams by a tube length proportioned to slightly exceed the extent of the suspected zone a. When pneumatically blown into position by equipment described hereinafter, the two dams are lightly inflated and when in position, their inflating pressure, using air, for example, can be increased. The disk 21b of the trailing dam is penetrated by the elastomer transport tube 3, which is a flexible tube, and like the tubes 4a and 4b, fixedly connects with the dam members. The disks 21a of the dam 2a is provided with vent tube 5.

Figure 3:
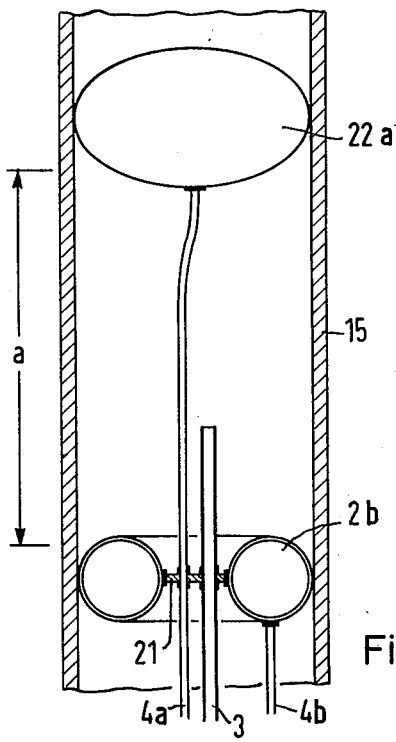
FIG. 3 is the same as FIG. 2, but shows a first modification.

As shown by FIG. 2, the elastomer under pressure has been transported through the open end of the tube having the zone a, through the end of the tube opening below the tube plate 14, it being understood that below this tube plate the bottom portion or primary header of the steam generator, has the usual manholes through which personnel can gain access to the open end of the cavity formed by the heat-exchanger tube under inspection. The introduction of the pressurized elastomer through the tube 5 into the space between the two dams has forced them apart within the limits permitted by their flexible interconnection in the form of the tube 4a, and in FIG. 2 the apparatus is now confining the elastomer between them, for the curing period. In FIG. 2 the elastomer itself is not shown, to avoid confusing the illustration. The inflating pressure within the two dams, although possibly increased to provide fluid-tight sealing, is not adequate to anchor the two dams against being displaced by the pressurized elastomer. In FIG. 3 the leading dam 22a is shown as comprising a single inflatable balloon-like dam, venting being possible by leakage around its periphery and using inflating pressure having a value permitting this effect as required for venting of air displaced by the injected elastomer.

Figure 4:
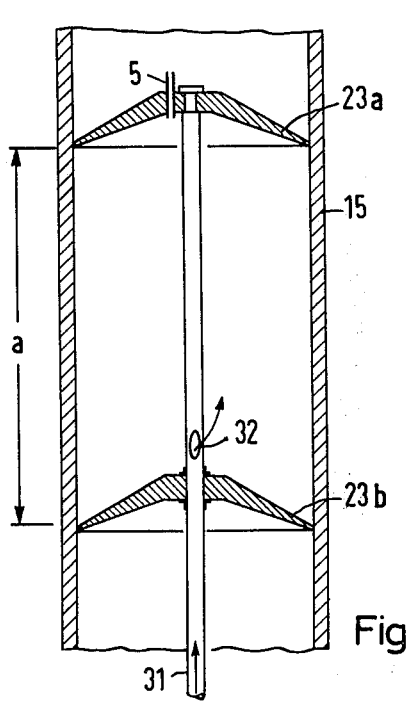
FIG. 4 is again like FIG. 2 but shows a second possible modification.

In the modification of FIG. 4 the inflatable dams are replaced by solid elastically deformable members 23a and 23b, such as may be formed by using a material having the consistency of rubber. Also, in this case, it is the elastomer transport tube 31 which provides the interconnection between the two dams for limiting their separation distance displaced by the injected elastomer, the tube 31 having a port 32 opening between the two dams.

Figure 5:
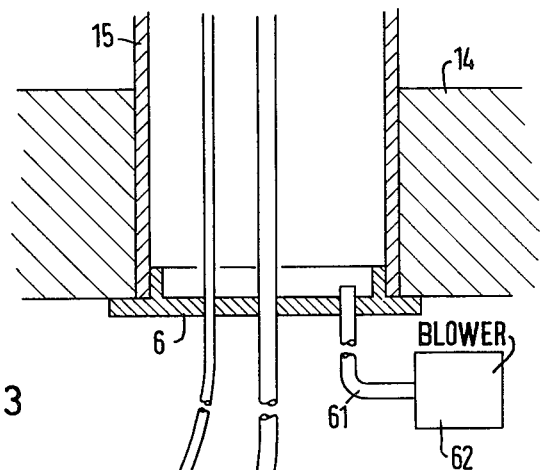
FIG. 5 shows the equipment on the outside of the heat-exchanger tube, which may be used for the practice of the present invention.

In FIG. 5 the open end of the heat-exchanger tube 15 under inspection, is closed by a plug 6 through which a compressed gas tube 61 extends from a blower 62 or other source of compressed gas, this being used to blow or pneumatically convey the two dams to within the zone a of the heat-exchanger tube. A blower 41 is connected with the dual inflating tube 4c, which may contain the tubes 4a and 4b, for inflation of the two dams when they are of the inflatable type. Finally, a pump 33 supplies the elastomer transport tube 3 with elastomer contained in a supply tank 34.

In operation, the blower 62 is operated first to blow or pneumatically convey the two dams to the location where the casting is to occur. The blower 41 is used to adjust the pneumatic dams to the desired and possibly higher sealing pressure. In all cases, the dams are radially elastically deformable so that they can be blown to position and thereafter provide sealing. Finally, the pump 33 is operated so that elastomer injected between the two dams, forces the dams apart so that the tube fills with the elastomer and is cast against the inner surface of the tube throughout the zone a.

After curing, which preferably is one at room temperatures or at least at no higher temperatures than permits the use of the apparatus, one or another of the tubes 4c or 3 is pulled to remove the cured casting, the plug 6 being, of course, removed at that time. If the elastically hardenable plastic used, such as in the case of the low-consistency silicone elastomer, might possibly bond to the interior surface of the tube, that surface is first coated with a parting material, such as glycerin, prior to the casting of the elastomer. This may be done by a suitable swab introduced to the zone a with the swab saturated with glycerin.

As previously indicated, the casting elastomer may be combined with reinforcing fillers to increase the strength of the casting when it is pulled from the casting location. The inflatable dams described have the advantages that when it is time to pull the cured casting from the tube, their inflating pressure can be released so that the pulling tension is applied substantially entirely to the casting itself, causing the casting to stretch and release itself from any depressions or cracks in the inside of the tube, which the elastomer may have penetrated, the tube which interconnects the two dams to limit their separation, usually itself being somewhat elastically deformable and stretching with the casting.

The technology of compounding elastically hardenable plastics, including silicone elastomers of the low-consistency type, is well known. The requirements for the present invention are that when uncured, the elastomer should be flowable so that it can be transported through its transport tube to the casting location, and it should cure at the normal temperatures existing during inspection of a pressurized reactor steam generator, when the reactor is shut down, such temperatures nominally being room temperatures. The curing time is not of great importance other than that it should be short enough for convenience.

What is claimed is:

1. A method for obtaining an image of the surface of an internal zone of a cavity having an open end, said method comprising transporting a flowable elastically hardenable casting plastic through said end to said zone and casting said plastic against said surface and hardening of said plastic to an elastic casting, pulling said casting from said zone and through said open end with said casting elastically retaining an image of said surface, dams for said cavity being first inserted through said end and initially moved to said zone, and with the dams flexibly interconnected against separation more than the extent of said zone, and said plastic being transported under pressure to said zone through a tube inserted through said end and the one of said dams most adjacent to said end, with said tube opening between said dams and said plastic being injected between said dams to separate the same so they embrace said zone, said dams being interconnected so as to hold the dams against said separation while said plastic is injected therebetween, and when pulling said casting from said zone, said casting elastically stretching and releasing itself from any depressions on the inside of said tube, said dams, while interconnected, permitting said stretching.

2. The method of claim 1 in which said dams are initially moved by being pneumatically blown through said cavity to said extreme of said zone.

3. The method of claim 2 in which said plastic is a low-consistency silicone elastomer which cures substantially at room temperatures to an elastically deformable hardened casting.

4. The method of claim 3 in which said dams are pulled by said tube from said zone and through said open end, to thereby pull said casting from said zone and through said end.

* * * * *